United States Patent
Elliot et al.

(10) Patent No.: US 10,953,685 B2
(45) Date of Patent: Mar. 23, 2021

(54) GRIP AID WRITING SYSTEM

(71) Applicant: SET Technology LLC, Bellmore, NY (US)

(72) Inventors: Daniel Elliot, Bellmore, NY (US); Jessica Scheff, Bellmore, NY (US); Jared Thurston, Wallingford, CT (US)

(73) Assignee: SET Technology LLC, Bellmore, NY (US)

( * ) Notice: Subject to any disclaimer, the term of this patent is extended or adjusted under 35 U.S.C. 154(b) by 0 days.

(21) Appl. No.: 16/039,951

(22) Filed: Jul. 19, 2018

(65) Prior Publication Data

US 2020/0023668 A1 Jan. 23, 2020

(51) Int. Cl.
| | |
|---|---|
| *B43K 23/008* | (2006.01) |
| *B43K 23/012* | (2006.01) |
| *B43K 24/08* | (2006.01) |
| *G09B 11/02* | (2006.01) |
| *F21Y 115/10* | (2016.01) |

(52) U.S. Cl.
CPC ............ *B43K 23/008* (2013.01); *G09B 11/02* (2013.01); *B43K 23/012* (2013.01); *B43K 24/08* (2013.01); *B43K 24/082* (2013.01); *F21Y 2115/10* (2016.08)

(58) Field of Classification Search
CPC .... B43K 23/008; B43K 23/00; B43K 23/004; B43K 23/012; B43K 24/00; B43K 24/04; B43K 24/02; B43K 24/082; B43K 24/026; B43K 24/08; G09B 11/02; G09B 11/00; F21Y 2115/10
USPC .................................. 401/6–8, 99, 103, 117
See application file for complete search history.

(56) References Cited

U.S. PATENT DOCUMENTS

| | | | |
|---|---|---|---|
| 5,505,553 A | 4/1996 | Saviano et al. | |
| 5,662,423 A | 9/1997 | Walden | |
| 5,662,425 A | 9/1997 | Mitsuya | |
| 6,062,753 A * | 5/2000 | Hadtke | B29C 45/1676 401/6 |
| 7,128,484 B2 | 10/2006 | Schulken | |
| 7,371,026 B2 | 5/2008 | Berger | |
| 7,794,163 B2 | 9/2010 | Bush, III et al. | |
| 8,156,610 B2 | 4/2012 | McKenzie et al. | |
| 9,283,802 B2 | 3/2016 | Briggl | |
| 2016/0229219 A1* | 8/2016 | Pincus | B43K 23/008 |

OTHER PUBLICATIONS

Schwellnus, H., et al., "Effect of Pencil Grasp on the Speed and Legibility of Handwriting in Children", The American Journal of Occupational Therapy, 2012, vol. 66, No. 6. 9 pages.
PCT International Search Report and Written Opinion dated Aug. 30, 2019 for PCT/US2019/042420.

* cited by examiner

*Primary Examiner* — David J Walczak
(74) *Attorney, Agent, or Firm* — McCarter & English, LLP

(57) ABSTRACT

A grip aid device for improving writing skills utilizes specific ergonomic and feedback mechanisms to promote an advantageous writing instrument grip and improve intrinsic hand musculature. The grip aid device includes strategically positioned pressure-based buttons, wherein each button interacts with a user's specific finger. The grip aid device features an incentive-based program that encourages the user to properly align their fingers to an approved grasp pattern, wherein simultaneously pressing the buttons causes the writing implement to emerge and become useable.

28 Claims, 2 Drawing Sheets

GRIP AID WRITING SYSTEM

FIELD OF DISCLOSURE

The present disclosure generally relates to a device for improving writing skills and addressing issues associated with gripping behavior. Particularly, the device utilizes specific ergonomic and feedback mechanism(s) to promote an advantageous writing instrument grip, improve intrinsic hand musculature and provide feedback concerning usage patterns/activities.

BACKGROUND

Proper handwriting techniques are invaluable for students and adults alike. An advantageous writing instrument grip/grasp provides an ergonomic writing style that produces legible handwriting at a satisfactory writing speed. A grip/grasp is generally defined according to the finger or palm contact with a writing instrument and the movement of the writing instrument. [Schwellnus, H. et al., Effect of Pencil Grasp on the Speed and Legibility of Handwriting in Children, The American Journal of Occupational Therapy, 2012, Vol. 66, No. 6].

Writing grasps are traditionally separated into two categories, immature grasps and mature grasps. The preferred mature grasp produces movement of a writing instrument through invoking the intrinsic muscles within a hand. In contrast, an immature grasp utilizes the extrinsic muscles of the arm and forces the fingers to remain stationary. [Schwellnus et al.]. The mature grasp classification is generally composed of four grasp patterns, including; dynamic tripod ("DT"); dynamic lateral tripod ("LT"); dynamic quadrupod ("DQ"); and dynamic lateral quadrupod ("LQ"). [Schwellnus et al.].

In operation and as illustrated by Schwellnus et al., the DT grasp involves the thumb, index and middle fingers functioning as a tripod. The LT grasp involves movement of the writing instrument by the index and middle fingers and passive involvement of the thumb, which contacts the lateral aspect of the index finger and often crosses over the writing instrument. The DQ grasp is similar to the DT grasp, but involves three fingers and the thumb. Lastly, the LQ grasp is similar to the LT grasp, except four fingers contact the writing instrument and movement of the writing instrument is accomplished by the index, middle and ring fingers.

Traditionally, writing difficulties result from incorrect or immature writing instrument grip, weakness of the intrinsic hand musculature and/or difficulty processing feedback of the grip and its effect on writing performance. Efforts to improve penmanship and encourage a tripod grasp have been attempted and are discussed below.

U.S. Pat. Nos. 7,128,484, 7,371,026, and 7,794,163 provide devices for attachment to a writing instrument to encourage a tripod grasp. However, since the writing instrument will function regardless of whether the user employs a tripod grasp, there is a risk that the user will employ an incorrect, less strenuous grip despite the presence of the disclosed attachment. U.S. Pat. Nos. 5,662,423 and 8,156,610 are writing assist devices that encourage less use of the intrinsic musculature in order to make writing easier. Utilization of these devices is likely to encourage improper grip and may even hinder the development of critical hand musculature, e.g., if used improperly or too frequently. U.S. Pat. No. 5,505,553 provides a device aimed at encouraging proper pressure between the writing instrument and writing surface, but fails to address grip-related issues and/or behavior.

Based on the foregoing, a need exists for a device/system that enhances grip behaviors associated with writing instruments. These and other inefficiencies and opportunities for improvement are addressed and/or overcome by the assemblies, systems and methods of the present disclosure.

SUMMARY

The present disclosure generally relates to a device for improving writing skills and providing feedback that allows/facilitates gripping-related issues to be recognized and addressed. Particularly, the device utilizes specific ergonomic and feedback mechanism(s) to promote an advantageous writing instrument grip and improve intrinsic hand musculature.

As used herein, a writing instrument includes any instrument that is capable of creating or tracing a mark on a surface. A writing instrument may function as an extension of a user's hand and include an advantageous grip for holding the writing instrument and for applying an advantageous amount of pressure. Examples of writing instruments include, but are not limited to, a pen, pencil, stylus, marker, crayon and brush. Of note, the disclosed writing instrument is not limited to instances where a user is writing; for example, the disclosed writing instrument may further include additional or ancillary functions, such as drawing and painting. Additionally, it is not a requirement that the disclosed writing instrument deposit pigment on a writing surface (e.g., a stylus for electronic devices).

An advantageous writing instrument grip/grasp provides an ergonomic writing style that produces legible handwriting at a satisfactory writing speed. Further, the disclosed grasp generally facilitates improvement of the intrinsic hand musculature. As discussed above, a grasp is generally defined according to the finger or palm contact with a writing instrument and the movement of the writing instrument. [Schwellnus, H. et al.]. Of note, grip and grasp may be used interchangeably throughout this disclosure. An advantageous writing grip may include a tripod grasp or a quadrupod grasp.

In an exemplary embodiment, the disclosed grip aid writing system includes strategically positioned pressure-based buttons, wherein each button is positioned so as to interact with a user's specific finger when desirably positioned relative to the device. Unlike devices that force a user's fingers into one of the above-mentioned mature grasps, the disclosed writing system features an incentive-based program that encourages the user to properly align his/her fingers to an approved grasp pattern, wherein simultaneously pressing the buttons associated with the device triggers a result, e.g., the writing implement (e.g., the tip) may be triggered to emerge and become useable.

The disclosed writing system may further include sensory feedback functionality. Examples of sensory feedback for properly positioned fingers may include audial (e.g., beep); visual (e.g., light); and tactile (e.g., vibration) feedback.

Exemplary embodiments of the present disclosure may be retrofitted onto an existing writing instrument or may be integrated within/onto a new writing instrument.

The present disclosure also provides a grip aid writing system that includes a writing instrument with a writing tip located at its distal end, a cap located at a proximal end, and a shaft located therebetween, wherein the shaft has an outer surface; a grip aid device with an outer surface and an inner surface and a distal end and a proximal end, wherein the distal end inner surface is mounted with respect to the distal end of the outer surface of the shaft; and at least three pressure-based buttons, wherein the pressure-based buttons are mounted with respect to the outer surface of the grip aid device and wherein simultaneous engagement with the pressure-based buttons causes a first responsive action.

In exemplary embodiments, the grip aid writing system of the present disclosure is configured such that the pressure-based buttons are located on the outer surface of the grip aid device in a pre-determined manner based on a desired grasp pattern. When properly used, a user's fingers engage with the pressure-based buttons when positioned in the desired grasp pattern.

In exemplary embodiments, the disclosed grip aid writing system functions such that the first responsive action may be selected from audial feedback, visual feedback, tactile feedback, and any combination thereof.

In further exemplary embodiments, the disclosed grip aid writing system is configured such that the writing implement is concentrically located within the shaft, and the writing implement has a writing tip that when triggered extends beyond the distal end of the writing instrument.

In additional exemplary embodiments, the disclosed grip aid writing system functions such that the first responsive action includes triggering of the writing implement.

The disclosed grip aid writing system may include one or more pressure-based buttons that operate to sense the pressure level applied thereto. In exemplary embodiments, the pressure-based button(s) may be configured to respond to pressure levels that fall within a predefined pressure range. In such exemplary implementations, the disclosed writing device may be adapted to respond when one or more of the buttons sense an applied pressure that falls outside the predefined pressure range. For example, a second responsive action may be triggered when the button(s) sense pressure levels outside the predefined range. Of note, the predefined pressure range may be the same or different for the plurality of buttons associated with the disclosed writing device. The second responsive action may be selected from audial feedback, visual feedback, tactile feedback, and any combination thereof. In further exemplary embodiments, the second responsive action may include disengagement of the writing implement (with or without one of the other second responsive actions described herein).

As noted above, the disclosed grip aid writing system may take various forms, including a pen, a pencil, a stylus, a marker, a crayon, a brush, and any combination and/or variation thereof.

The disclosed grip aid device may be fabricated from various materials, including rubber, plastic, foam, metal, and any combination thereof.

The disclosed buttons may take various forms, including a switch, a lever, a toggle, a sensor, and any combination thereof.

Various mounting options are contemplated according to the present disclosure. For example, the disclosed grip aid writing system may fabricated such that at least one of the feedback capabilities is mounted with respect to the grip aid device. Alternatively, at least one of the feedback capabilities may be mounted with respect to the writing instrument. In exemplary implementations, LED(s) for visual feedback may be mounted with respect to the proximal end of the writing instrument.

The disclosed grip aid device may be removable from the writing instrument.

Contoured portions may formed on the exterior of the device, e.g., to surround one or more of the buttons. In addition, one or more of the buttons may include distinguishable indicia, e.g., they may be color coded based on a desired grasp pattern.

In exemplary embodiments, the disclosed grip aid device may include buttons for a plurality of desired grasp patterns.

The disclosure also provides an advantageous method for detecting grasp pattern compliance that includes measuring/monitoring the pressure of a distal end of a writing instrument on a writing surface; measuring/monitoring the pressure applied relative to a first sensor based on a first finger; measuring/monitoring the pressure of applied relative to a second sensor based on a second finger; and measuring/monitoring the pressure applied relative to a third sensor based on a third finger, wherein the first sensor, the second sensor, and the third sensor are located on an outer surface of a grip aid device, and wherein a first responsive action occurs or is triggered if the applied pressures are within a predetermined allowable range.

In exemplary embodiments, the disclosed method for detecting grasp pattern operates such that the first responsive action may be audial feedback, visual feedback, tactile feedback, and any combination thereof.

In the disclosed method, a writing implement may be mounted with respect to the distal end of the writing instrument, and the first responsive action may include engagement/triggering of the writing implement.

In further exemplary embodiments, the disclosed method may respond to situations where the applied pressure falls outside the predetermined allowable range for one or more of the sensors. The response may entail a second responsive action, e.g., audial feedback, visual feedback, tactile feedback, and any combination thereof. The second responsive action may also entail, for example, disengagement of the writing implement.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE FIGURES

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure.

Figure 1:
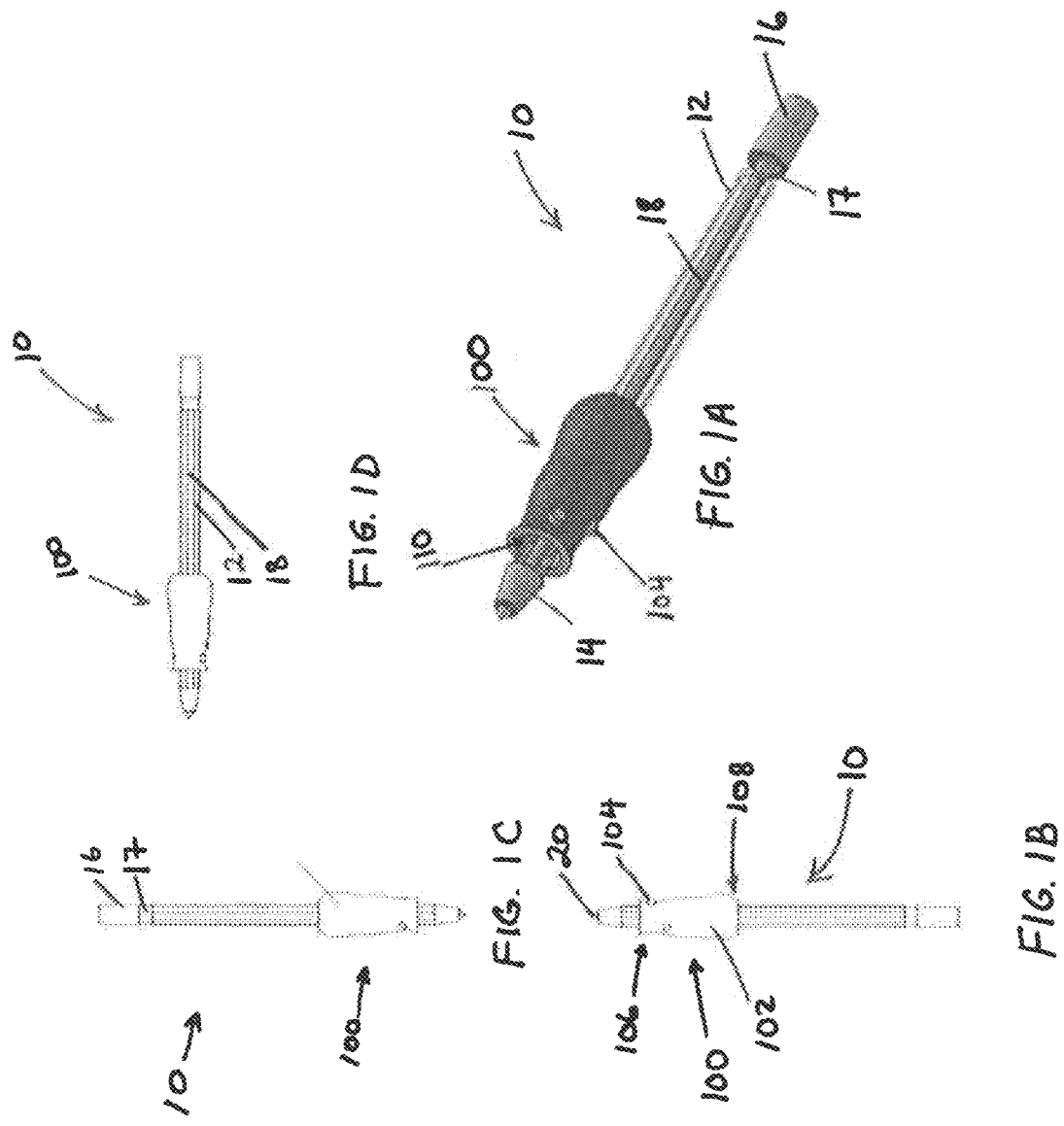
Figure 2:
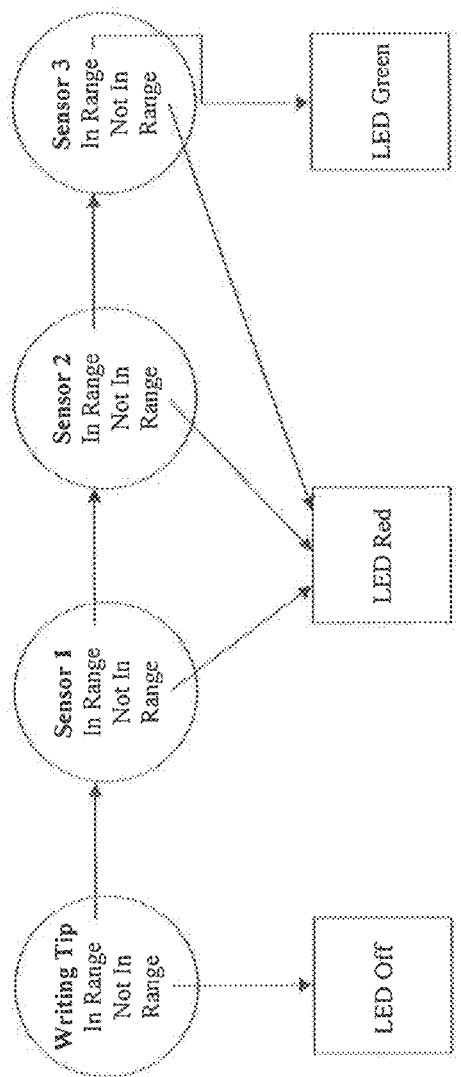

To assist those of ordinary skill in the art in making and using the disclosed assemblies, systems and methods, reference is made to the appended figures, wherein:

FIG. 1A schematically depicts a perspective view of an exemplary grip aid writing system according to the present disclosure;

FIG. 1B schematically depicts a side view of an exemplary grip aid writing system according to the present disclosure;

FIG. 1C schematically depicts a side view of an exemplary grip aid writing system according to the present disclosure;

FIG. 1D schematically depicts a side view of an exemplary grip aid writing system according to the present disclosure; and FIG. 2 depicts an exemplary sensing process according to the present disclosure.

DETAILED DESCRIPTION

The exemplary embodiments disclosed herein are illustrative of an advantageous device for improving writing skills. Particularly, the device utilizes specific ergonomic and feedback mechanisms to promote an advantageous writing instrument grip and improve intrinsic hand musculature. As mentioned above, current writing correction instruments fail to facilitate natural grip corrective measures with dynamic feedback mechanisms. The disclosed writing system may feature an incentive-based program that encourages the user to properly align their fingers on the writing instrument, wherein simultaneously pressing a series of pressure-based buttons causes the writing implement (e.g., the tip) to emerge and become useable. The disclosed writing system may further include at least one sensory feedback (e.g., audial, visual, tactile) in response to at least one performance threshold (e.g., proper grip orientation, proper grip strength, proper writing pressure, and any combination thereof).

Writing instrument includes a distal end and a proximal end and a shaft positioned therebetween, wherein a writing implement (e.g., writing tip) is associated with the distal end. Examples of writing instruments, include, but are not limited to a pen, pencil, stylus, marker, crayon, and brush. Of note, the disclosed writing instrument is not limited to instances where a user is writing; the disclosed writing instrument may further include additional functions such as drawing and painting. Additionally, it is not a requirement that the disclosed writing instrument deposit pigment on a writing surface (e.g., stylus for electronic devices). The writing instrument may further include a mechanism to engage and disengage the writing tip. Any required components of the writing tip (e.g., ink, lead, extenders, among others) may be stored within the shaft.

To encourage a functional writing style, a grip aid writing system may be located in close proximity to the writing tip. As used throughout, grip aid writing system may be referred to as grip aid device, grip aid, writing system, and any combination thereof. Grip aid device may be incorporated into a new writing instrument or may be retrofitted to an existing writing instrument.

Grip aid device features a plurality of buttons that are systematically positioned in close proximity to the writing implement such that when the plurality of pressure-based buttons are simultaneously pressed, the writing tip emerges from the distal end. The buttons incentivize a user to properly orient their fingers into one of the mature grasps, discussed above. As used throughout, button refers to any feature that when activated results in an action. Therefore, button may refer to an electrical or mechanical component, for example, a switch, lever, toggle, sensor, among others. It is not a requirement of the button to be depressible, therefore, buttons that sense contact may also be utilized. The button, or area in close proximity thereto, may further include tactile feedback, for example, feeling the button depress or resting a user's finger within a predefined feature (e.g., concave indents or curvature) to ensure the user knows they are in contact with the button.

Grip aid device may further include a curvature surrounding at least one button to prevent the user from pressing the plurality of buttons using a non-preferred grasp. The shape of each button may be contoured to receive a specific finger, for example, if the index finger was required to be situated in a specific direction, the button may include a feature to ergonomically engage with the finger. For example, the outer face of the button may be slanted in the direction of a user's finger.

Unlike traditional writing implements that may include a writing tip that remains engaged once activated, in an exemplary embodiment, the disclosed writing implement requires constant grip orientation to ensure the writing tip remains engaged. Failing to maintain all of the defined performance threshold(s), depending which performance threshold(s) is/are required, will cause the writing tip to retract within the shaft.

Turning to the figures, FIGS. 1A-1D (hereinafter "FIG. 1") depict an exemplary grip aid device 100. FIG. 1 illustrates grip aid device 100 associated with writing instrument 10. As mentioned above, grip aid device 100 may be integrated with writing instrument 10 or may be retrofitted to an existing writing instrument 10. Writing instrument 10 includes a distal end, exemplified by conical tip 14, which is directly/indirectly in relation to shaft 12. In exemplary embodiments wherein writing instrument 10 further includes pigment (e.g., ink, lead), the disclosed pigment reservoir 18 and writing tip 20 may be concentrically associated with conical tip 14 and shaft 12. Writing instrument 10 further includes a proximal end, exemplified by cap 16, which is directly/indirectly in relation to shaft 12, opposite conical tip 14. Cap 16 may be associated with section 17 of shaft 12.

In an exemplary embodiment, cap 16 may further include visual feedback to alert a user of compliant finger positioning for a given grasp selection (e.g., DT, LT, DQ, LQ). Writing instrument may further include an actuator (not shown) that is associated with pigment reservoir 18 and coupled to grip aid device 100, as mentioned above, such that compliant finger positioning on buttons 104 will engage writing tip 20. Section 17 of shaft 12 may further include electronic equipment to control the feedback system and/or the actuator.

As stated above, grip aid device 100 may be integrated with writing instrument 10 or may be retrofitted to an existing writing instrument 10. Grip aid device 100 includes grip 102, which further includes distal end 106 and proximal end 108. Grip 102 is directly/indirectly in relation to shaft 12, wherein distal end 106 is in relation to conical tip 14. In an exemplary embodiment, grip 102 may be partially tapered beginning at proximal end 108 and extending to distal end 106. Grip 102 may further include several contoured portions to naturally guide a user's fingers to the preferred grasp combination. Grip aid device 100 may be adaptable to accept each of the preferred grasp combinations. Grip aid device 100 further includes a plurality of pressure-based buttons 104 systematically positioned around grip 102 such that buttons 104, in combination, resemble at least one grasp layout. As mentioned above, buttons 104 may be mechanical or electrical. The disclosed contoured portions may be surrounding buttons 104 or may replace buttons 104 with surface flush (or nearly flush) sensors.

Grip aid device 100 may resemble a rubber grip that is concentrically located around shaft 12. Grip aid device 100 may be removable from shaft 12. Grip aid device 100 may rest within a predefined position on shaft 12 or may be movable based on a user's desire. In the case of movability, grip aid device 100 may remain associated with shaft 12 through friction. In an exemplary embodiment, the electrical components and sensory feedback may be incorporated within grip aid device 100. Grip aid device 100 may be fabricated from various materials, including rubber, plastic, foam, metal, and any combination thereof.

In yet another embodiment, a plurality of buttons 104 may be included around grip 102 such that grip aid device 100 can accommodate each of the preferred grasp combinations. Specific buttons 104 may be reused for several grasp combinations. For example, if the location of a user's finger for one grasp pattern is in close proximity to the location of the user's finger for another grasp pattern, button 104 may be used for both grasp patterns. Buttons 104 associated with each grasp combination may be color-coded to differentiate between each combination.

Grip aid device 100 may further include at least one energy storage component to at least partially power grip aid device 100 (e.g., feedback alerts and/or writing implement actuation). In some cases, the at least one energy storage component may be a battery. For example, the battery may be disposable or rechargeable. In an instance where the battery is rechargeable, recharging capabilities may be incorporated within grip aid device 100 or writing instrument 10 (e.g., retractable power cord). In other instances, grip aid device 100 or writing instrument 10 may include a connector interface for connecting a power cord for recharging. In another instance, grip aid device 100 may include energy harvesting capabilities. Such energy harvesting capabilities may include chemical, thermal, and/or mechanical harvesting. Specifically, biofuel cells, thermoelectric, triboelectric, and/or piezoelectric materials may be used to power grip aid device 100. The disclosed energy storage component may be integrated within and/or affixed to grip aid device 100 and/or writing instrument 10.

In another exemplary embodiment, writing implement 10 may be a stylus. A stylus is a writing instrument that may be used on any electronic device (e.g., cellphone, tablet, computer, computer tablet, video game, etc.) for use as a standard writing instrument. As mentioned above, grip aid device 100 may be integrated with writing instrument 10 or may be retrofitted to an existing writing instrument 10. The disclosed stylus may be used on any touchscreen, for example, a resistive touchscreen, a surface acoustic wave touchscreen, and a capacitive touchscreen. In the case of the capacitive touchscreen, the stylus and/or grip aid device 100 must further include conductive components to allow electrical contact with the user's fingertips. For example, shaft 12, grip 102, and/or buttons 104 may include conductive components for interaction with a user's fingertips. Grip aid device 100 would function as discussed above, providing specific ergonomic and feedback mechanisms to promote an advantageous writing instrument grip and improve intrinsic hand musculature.

FIG. 2 depicts a logic diagram based on a three button grip aid device and an LED visual alert. Of note, "in range" refers to whether the desired pressure was achieved within a predefined acceptable range.

To begin, the pressure of the writing tip on the writing surface is measured. If within range, the system proceeds to sensor number one ("Sensor 1"). If outside of the range, the LED remains off and no action occurs.

Next, the pressure of Sensor 1 based on a first finger is measured. If within range, the system proceeds to sensor number two ("Sensor 2"). If outside the range, the LED is activated and displays the color red.

Next, the pressure of Sensor 2 based on a second finger is measured. If within range, the system proceeds to sensor number three ("Sensor 3"). If outside the range, the LED is activated and displays the color red.

Finally, the pressure of Sensor 3 based on a third finger is measured. If within range, the LED is activated and displays the color green. If outside the range, the LED is activated and displays the color red.

If at anytime during this sequence one or more of the previously acceptable pressures fall outside of the acceptable range (e.g., user removes finger from sensor), the system will activate and display a red LED.

Although depicted with three sensors and a visual feedback system (e.g., LED), system may further include a fourth sensor for more advanced versions. Further, tactile and/or audial feedback may be incorporated with or in addition to the visual feedback, such that the feedback may include visual, audial, and/or tactile. The features (e.g., activation of the LED, color, vibration pulse, sound type or volume) of the feedback system may be altered without departing from the spirit/scope of this disclosure. Furthermore, engagement of the writing tip (i.e., activation of the writing tip to extend beyond conical tip 14) may be incorporated with the feedback system or in replace thereof.

Although the present disclosure has been described with reference to exemplary implementations, the present disclosure is not limited by or to such exemplary implementations. Rather, various modifications, refinements and/or alternative implementations may be adopted without departing from the spirit or scope of the present disclosure.

The invention claimed is:

1. A grip aid writing system, comprising:
a writing instrument with a writing implement mounted with respect to a shaft, wherein the shaft defines an outer surface;
a grip aid device with an outer surface, an inner surface, a distal end and a proximal end, wherein the inner surface of the grip aid device is mounted with respect to the outer surface of the shaft of the writing instrument; and
at least three pressure-based buttons mounted with respect to the outer surface of the grip aid device,
wherein simultaneous engagement with the at least three pressure-based buttons causes the writing implement to assume an useable condition.

2. A grip aid writing system of claim 1, wherein the pressure-based buttons are located on the outer surface of the grip aid device based on a desired grasp pattern.

3. A grip aid writing system of claim 2, wherein the grip aid device further comprises buttons for all of the desired grasp patterns.

4. A grip aid writing system of claim 2, wherein the pressure-based buttons are configured to permit a user's fingers to apply gripping pressure to the pressure-based buttons based on the desired grasp pattern.

5. A grip aid writing system of claim 1, wherein simultaneous engagement with the at least three pressure-based buttons causes a responsive action selected from a group consisting of audial feedback, visual feedback, tactile feedback, and any combination thereof.

6. A grip aid writing system of claim 5, wherein at least one of the feedback capabilities is mounted with respect to the grip aid device.

7. A grip aid writing system of claim 5, wherein at least one of the feedback capabilities is mounted with respect to the writing instrument.

8. A grip aid writing system of claim 5, wherein a LED for visual feedback is mounted with respect to the proximal end of the writing instrument.

9. A grip aid writing system of claim 1, wherein at least one of the pressure-based buttons is responsive to an applied pressure within a predefined pressure range.

10. A grip aid writing system of claim 9, wherein when the applied pressure falls outside the predefined pressure range, a second responsive action is triggered.

11. A grip aid writing system of claim 10, wherein the second responsive action is selected from a group consisting of audial feedback, visual feedback, tactile feedback, and any combination thereof.

12. A grip aid writing system of claim 1, wherein the writing instrument is selected from a group consisting of a pen, a pencil, a stylus, a marker, a crayon, a brush, and any combination thereof.

13. A grip aid writing system of claim 1, wherein the grip aid device is fabricated from a material selected from the group consisting of rubber, plastic, foam, metal, wood and any combination thereof.

14. A grip aid writing system of claim 1, wherein the buttons are selected from a group consisting of a switch, a lever, a toggle, a sensor, and any combination thereof.

15. A grip aid writing system of claim 1, wherein the grip aid device is removable from the writing instrument.

16. A grip aid writing system of claim 1, further comprising contoured portions surrounding the buttons.

17. A grip aid writing system of claim 1, further comprising a conductive component for electrical communication with a user.

18. A grip aid writing system, comprising:
a writing instrument including a shaft and a writing tip located at a distal end of the shaft, wherein the shaft defines an outer surface;
a grip aid device with an outer surface, an inner surface, a distal end and a proximal end, wherein the inner surface of the grip aid device is mounted with respect to the outer surface of the shaft of the writing instrument;
at least three pressure-based buttons mounted with respect to the outer surface of the grip aid device,
wherein simultaneous engagement with the at least three pressure-based buttons causes a first responsive action; and
wherein the first responsive action comprises engagement of the writing implement.

19. A grip aid writing system, comprising:
a writing instrument including a shaft and a writing tip located at a distal end of the shaft, wherein the shaft defines an outer surface;
a grip aid device with an outer surface, an inner surface, a distal end and a proximal end, wherein the inner surface of the grip aid device is mounted with respect to the outer surface of the shaft of the writing instrument;
at least three pressure-based buttons mounted with respect to the outer surface of the grip aid device,
wherein simultaneous engagement with the at least three pressure-based buttons causes a first responsive action;
wherein at least one of the pressure-based buttons is responsive to an applied pressure within a predefined pressure range;
wherein when the applied pressure falls outside the predefined pressure range, a second responsive action is triggered; and
wherein the second responsive action comprises disengagement of the writing implement.

20. A grip aid writing system, comprising:
a writing instrument including a shaft and a writing tip located at a distal end of the shaft, wherein the shaft defines an outer surface;
a grip aid device with an outer surface, an inner surface, a distal end and a proximal end, wherein the inner surface of the grip aid device is mounted with respect to the outer surface of the shaft of the writing instrument;
at least three pressure-based buttons mounted with respect to the outer surface of the grip aid device,
wherein simultaneous engagement with the at least three pressure-based buttons causes a first responsive action;
wherein at least one of the pressure-based buttons is responsive to an applied pressure within a predefined pressure range;
wherein when the applied pressure falls outside the predefined pressure range, a second responsive action is triggered; and
wherein the at least three pressure-based buttons are associated with distinct predefined pressure ranges.

21. A grip aid writing system, comprising:
a writing instrument including a shaft and a writing tip located at a distal end of the shaft, wherein the shaft defines an outer surface;
a grip aid device with an outer surface, an inner surface, a distal end and a proximal end, wherein the inner surface of the grip aid device is mounted with respect to the outer surface of the shaft of the writing instrument; and
at least three pressure-based buttons mounted with respect to the outer surface of the grip aid device,
wherein simultaneous engagement with the at least three pressure-based buttons causes a first responsive action;
wherein the at least three pressure-based buttons are located on the outer surface of the grip aid device based on a desired grasp pattern; and
wherein the at least three pressure-based buttons are colored based on the desired grasp pattern.

22. A writing system, comprising:
a writing instrument that includes a writing implement mounted with respect to a shaft, and at least three pressure-based buttons mounted with respect to an outer surface of the shaft,
wherein simultaneous engagement with the at least three pressure-based buttons causes the writing implement to assume an useable condition.

23. A method of detecting grasp pattern compliance, comprising:
measuring or monitoring the pressure of a distal end of a writing instrument on a writing surface;
measuring or monitoring the pressure of a first sensor based on interaction with a first finger;
measuring or monitoring the pressure of a second sensor based on interaction with a second finger; and
measuring or monitoring the pressure of a third sensor based on interaction with a third finger,
wherein the first sensor, the second sensor, and the third sensor are located on an outer surface of a grip aid device, wherein a first responsive action occurs if the pressures applied to the sensors are within a predetermined allowable range.

24. A method of claim 23, wherein the first responsive action is selected from a group consisting of audial feedback, visual feedback, tactile feedback, and any combination thereof.

25. A method of claim 23, further comprising a writing implement mounted with respect to the distal end of the writing instrument, wherein the first responsive action comprises engagement of the writing implement.

26. A method of claim 25, further comprising a writing implement mounted with respect to the distal end of the writing instrument, wherein the second responsive action comprises disengagement of the writing implement.

27. A method of claim 23, wherein when the pressure applied to one or more sensors falls outside the predetermined pressure range, a second responsive action occurs.

28. A method of claim 27, wherein the second responsive action is selected from a group consisting of audial feedback, visual feedback, tactile feedback, and any combination thereof.

* * * * *